US009213921B2

(12) United States Patent
Lei et al.

(10) Patent No.: US 9,213,921 B2
(45) Date of Patent: Dec. 15, 2015

(54) ELECTRONIC CARD CONNECTOR AND ELECTRONIC DEVICE USING THE SAME

(71) Applicant: ShenZhen Treasure City Technology Co., LTD., Shenzhen (CN)

(72) Inventors: Qian Lei, Shenzhen (CN); Zhong-Qiong Yang, Shenzhen (CN)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 0 days.

(21) Appl. No.: 14/518,703

(22) Filed: Oct. 20, 2014

(65) Prior Publication Data
US 2015/0118876 A1  Apr. 30, 2015

(30) Foreign Application Priority Data
Oct. 31, 2013  (CN) .......................... 2013 1 0525952

(51) Int. Cl.
*G06K 7/00* (2006.01)
*G06K 13/08* (2006.01)
*H01R 12/72* (2011.01)

(52) U.S. Cl.
CPC .......... *G06K 13/0856* (2013.01); *G06K 7/0013* (2013.01); *G06K 13/0831* (2013.01); *H01R 12/72* (2013.01)

(58) Field of Classification Search
CPC .......... G06K 13/0831; G06K 13/0856; G06K 7/0013; H01R 13/62905; H01R 12/72; H05K 5/0286; H05K 5/0295; H05K 5/0291
USPC ......................... 439/157, 159, 327, 328, 630; 361/736–759, 807–810, 728, 629
See application file for complete search history.

(56) References Cited

U.S. PATENT DOCUMENTS

| 7,314,390 | B1* | 1/2008 | Lai | G06K 13/08 439/159 |
| 8,493,742 | B2* | 7/2013 | Li | G06F 1/1601 200/341 |
| 8,730,680 | B2* | 5/2014 | Tang | G06K 13/0825 361/737 |
| 8,783,797 | B2* | 7/2014 | Yang | G06K 13/0831 312/223.2 |
| 8,801,468 | B2* | 8/2014 | Gao | G06K 13/0831 439/630 |
| 2014/0029211 | A1* | 1/2014 | Gao | H05K 5/0091 361/747 |
| 2014/0141642 | A1* | 5/2014 | Liao | G06K 13/0825 439/372 |
| 2015/0171552 | A1* | 6/2015 | Lei | G06K 7/04 439/153 |

* cited by examiner

*Primary Examiner* — Amy Cohen Johnson
*Assistant Examiner* — Oscar C Jimenez
(74) *Attorney, Agent, or Firm* — Novak Druce Connolly Bove + Quigg LLP

(57) ABSTRACT

An electronic device includes a housing and an electronic card connector fixed on the housing. The electronic card connector includes a tray and a fixing member. The tray includes a main body defining a card slot. The tray further includes two elastic arms protruding from two sidewalls of the tray respectively. The elastic arms include protrusions. The fixing member includes two notches corresponding to the two protrusions. When the main body receives in the second accommodating space, each of the two protrusions receives in one of the two notches respectively to engage the tray with the fixing member. When a pressure applied on the two elastic arms to enable the two protrusions to disengage from the two notches, the tray is disengaged from the fixing member.

15 Claims, 6 Drawing Sheets

ELECTRONIC CARD CONNECTOR AND ELECTRONIC DEVICE USING THE SAME

FIELD

The subject matter herein generally relates to an electronic card connector and an electronic device using the same.

BACKGROUND

Electronic card connector, such as Subscriber Identity Model card (SIM card), Secure Digital Memory Card (SD card) or like can be inserted into an electronic device, so that the electronic device can communicate with other electronic devices or store information.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
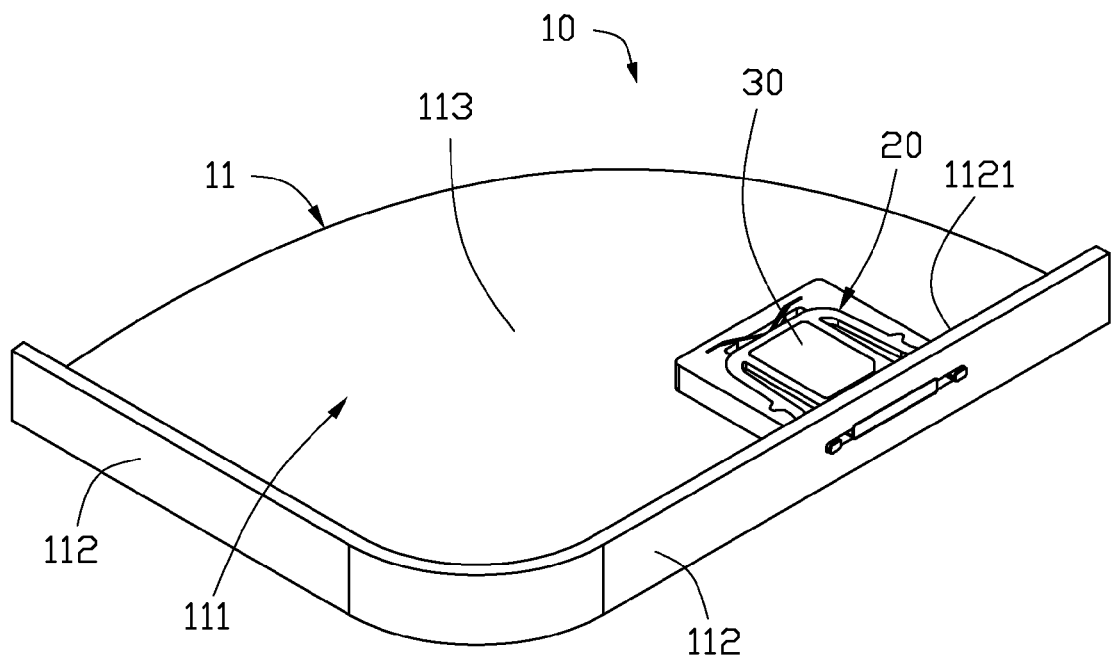
FIG. 1 is an isometric view of an embodiment of an electronic device having an electronic card connector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 shows an electronic device 10. The electronic device 10 can include a housing 11. The electronic device 10 can also include other functional modules to fulfill different functions. However, it is not shown and specifically described for simplification.

Figure 2:
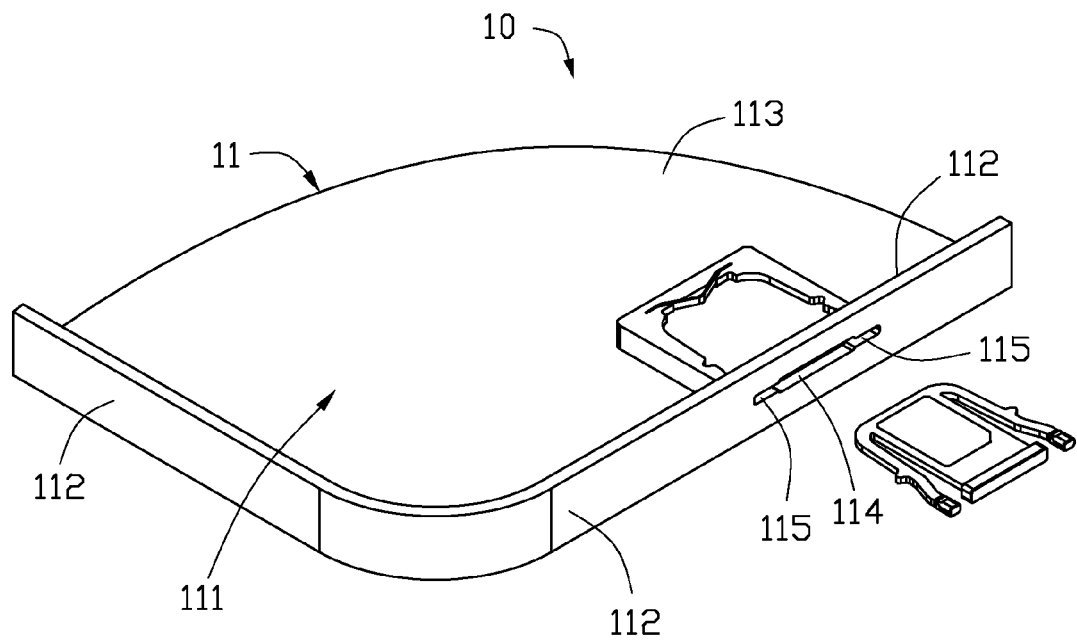
FIG. 2 is a first exploded isometric view of the electronic device shown in FIG. 1.

As shown in FIG. 2, the housing 11 can include a first supporting wall 113 and two peripheral sidewalls 112 connected to the first supporting wall 113 and other peripheral sidewalls (not labeled) connected to the first supporting wall 113. The two peripheral sidewalls 112, the first supporting wall 113 and the other peripheral sidewalls can cooperatively define a first accommodating space 111. One of the peripheral sidewall 112 can define a first through hole 114 and two second through holes 115 located on the two sides of the first through hole 114 symmetrically and communicating with the first through hole 114.

Figure 3:
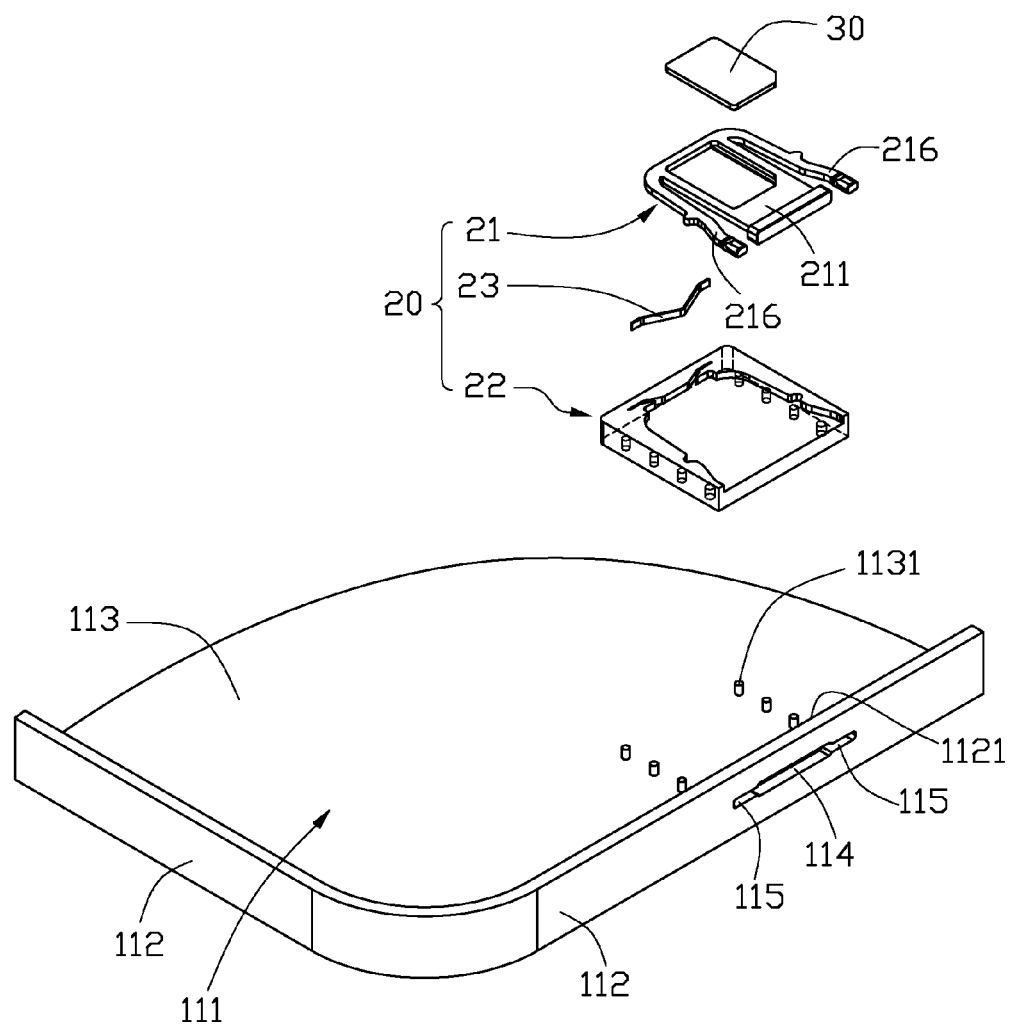
FIG. 3 is a second exploded isometric view of the electronic device shown in FIG.
Figure 4:
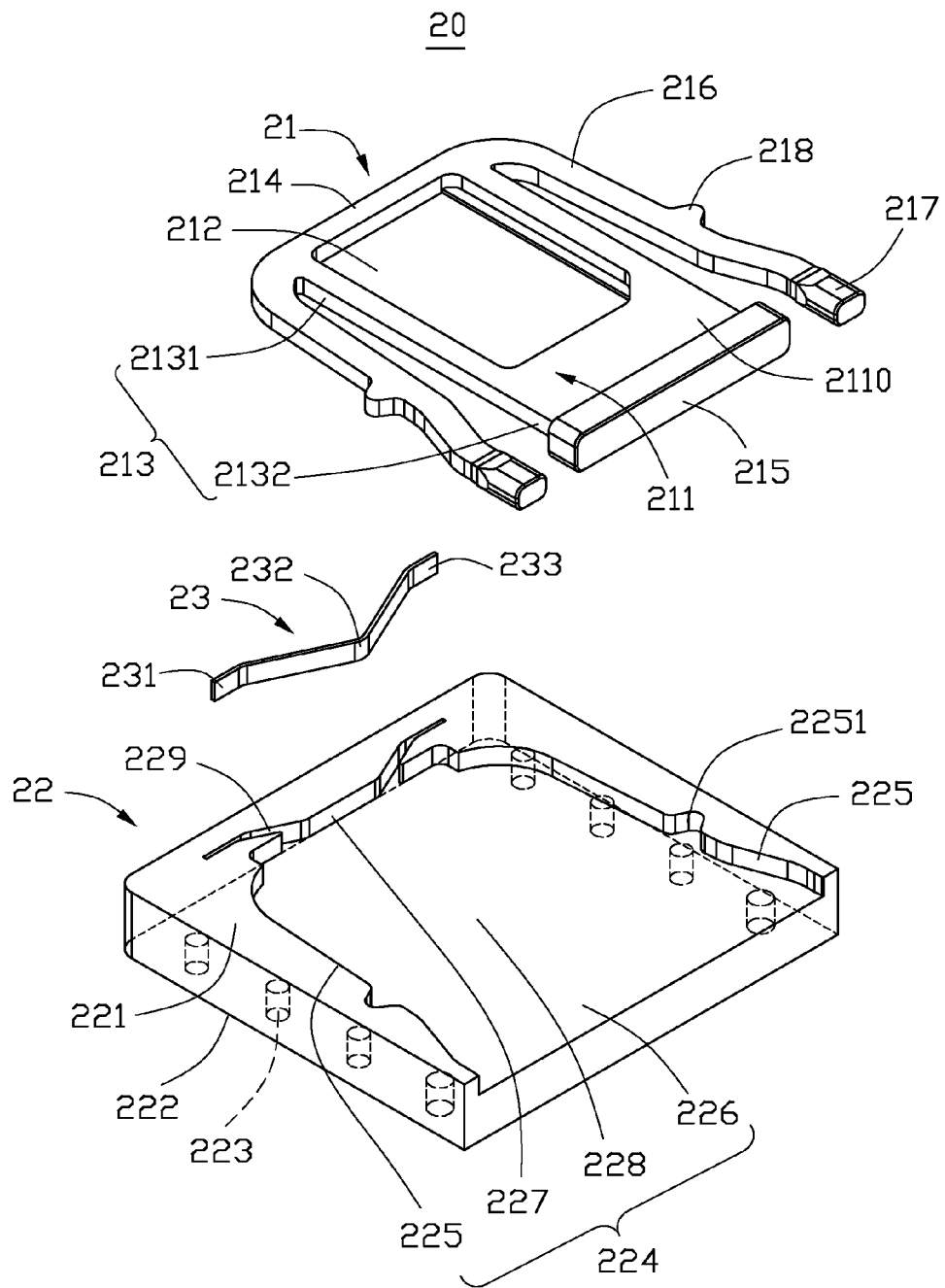
FIG. 4 is an exploded isometric view of the electronic card connector shown in FIG. 3.

As shown in FIGS. 3 and 4, the electronic device 10 can further include an electronic card connector 20 accommodated in the first accommodating space 111. The electronic card connector 20 can include a tray 21, a fixing member 22 and an elastic member 23.

The tray 21 can include a main body 211 and two elastic arms 216. The main body 211 can have a first upper surface 2110. The main body 211 can define a card slot 212 on the first upper surface 2110. The card slot 212 is configured to accommodate an electronic card 30. The main body 211 can further have a first end 214, a second end 215 opposite to the first end 214, and two sidewalls 213 parallel with each other. The two sidewalls 213 can couple the first end 214 with the second end 215. The sidewall 213 can have a first side 2131 close to the first end 214 and a second side 2132 close to the second end 215.

The two elastic arms 216 can protrude from the first sides 2131, and further bend and extend towards the second sides 2132 respectively. The distance between the elastic arm 216 and the sidewall 213 is increased from the first end 2131 to the second end 2132 gradually. The length of the elastic arm 216 is larger than that of the sidewall 213. Each elastic arm 216 can have a free end 217. When a pressure is applied on the two free ends 217 of two elastic arms 216 to enable the elastic arms 216 to move towards each other, the distance between the two elastic arms 216 is decreased. When no pressure is applied on the two elastic arms 216, the two elastic arms 216 can be driven to move away from each other to restore themselves by the elastic restoring force of the two elastic arms 216.

Each of the two elastic arms 216 can further include a protrusion 218 protruding from one side of the each of the two elastic arms 216 away from the sidewall 213. In this embodiment, the protrusion 218 is substantially located on the middle of the elastic arm 216.

The fixing body 22 can have a second upper surface 221 and a lower surface 222 opposite to the second upper surface 221. The fixing body 22 can define a second accommodating space 224 recessed from the second upper surface 221. The fixing body 22 can further have two first sidewalls 225, an opening 226, a second sidewall 227 facing toward the opening 226, and a second supporting wall 228. The second accommodating space 224 can be formed by the two first sidewalls 225, the opening 226, the second sidewall 227 and the second supporting wall 228. The second accommodating space 224 can be used for accommodating the main body 211. Furthermore, the shape of the first sidewall 225 is matched with the shape of the elastic arm 216. The fixing body 22 can further define a notch 2251 corresponding to the protrusion 218 on the first sidewall 225. The protrusion 218 can be received in the notch 2251 to engage the tray 21 with the fixing body 22. The fixing body 22 can further define a slot 229 on the second sidewall 227.

In this embodiment, the fixing body 22 can further define a number of accommodating holes 223 on the supporting wall surface 222. The housing 11 can further include a number of second protrusions 1131 protruding from the first supporting wall 113. The second protrusions 1131 can correspond to the accommodating holes 223 and be received in the accommodating holes 223 respectively so that the fixing body 22 can be fixed to the housing 11. In at least one embodiment, the fixing body 22 can be fixed to the main body 21 by other ways, such as the fixing body 22 can be glued to the housing 11. When the fixing body 22 is fixed to the first supporting wall 113, one end of the fixing body 22 close to the opening 226 is resisted on inside surface 1121 of the peripheral sidewall 112, and the opening 226 is facing the first through hole 114.

The elastic member 23 is resisted between the first end 2131 and the second sidewall 227. In the embodiment, the elastic member 23 is an arched elastic member. The elastic member 23 can include two fixing portions 231, a resisting portion 232 and two connecting portions 233 connecting the two fixing portions 231 with the resisting portion 232. The shape of the slot 229 is matched with the shape of the two fixing portions 231. The fixing portions 231 can be received in the slot 229. The resisting portion 232 and the connecting portions 233 can be received in the second accommodating space 224, and the resisting portion 232 can further resist on the first end 214.

Figure 5:
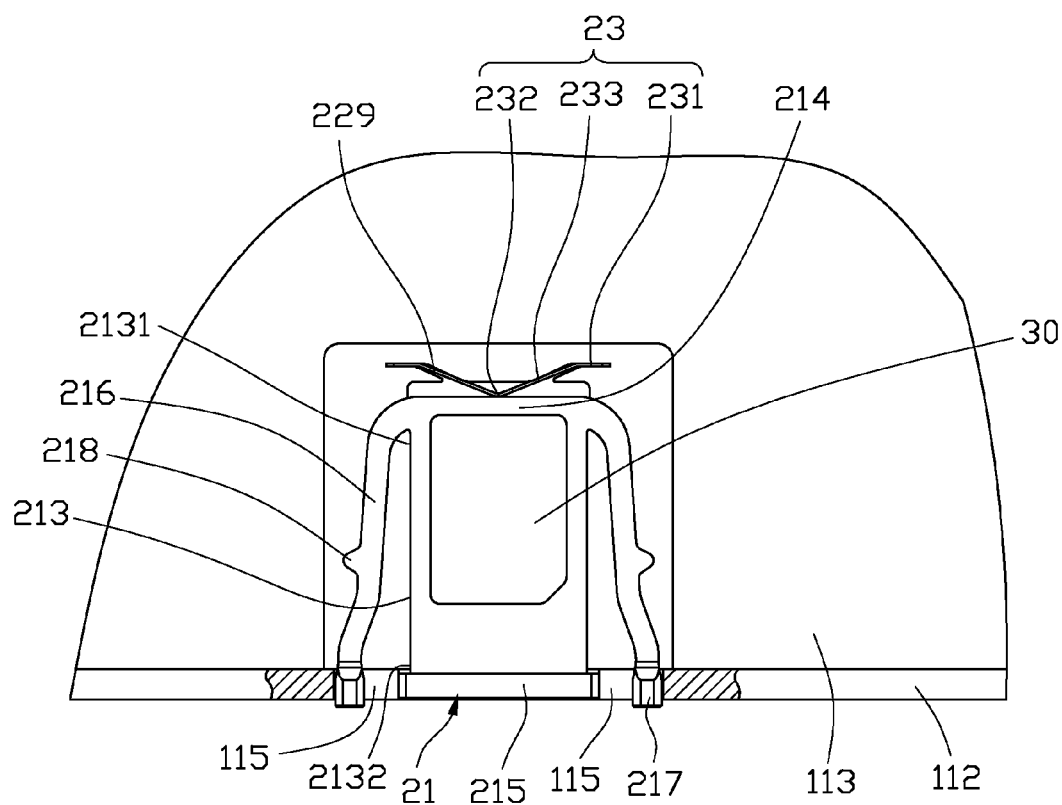
FIG. 5 is a first state top plan view of the electronic card connector shown in FIG. 1.

As shown in FIG. 5, when in assembly, each of the second protrusions 1131 is received in one of the accommodating holes 223 to fix the fixing body 22 to the first supporting wall 113 of the housing 11. The fixing portion 231 of the elastic member 23 is received in the slot 229 of the fixing body 22 to fix the elastic member 23 to the fixing body 22. The tray 21 is pushed to pass through the first through hole 114 and the second through hole 115 to enable the main body 211 to be received in the second accommodating space 224, to enable the second end 215 to be received in the first through hole 114, and to enable the free end 217 to be received in the second through hole 115, and to enable each of the protrusions 218 to receive in one of the notches 2251 respectively to engage the tray 21 with the fixing body 22. When the tray 21 is engaged with the fixing body 22, the elastic member 23 is then depressed.

Figure 6:
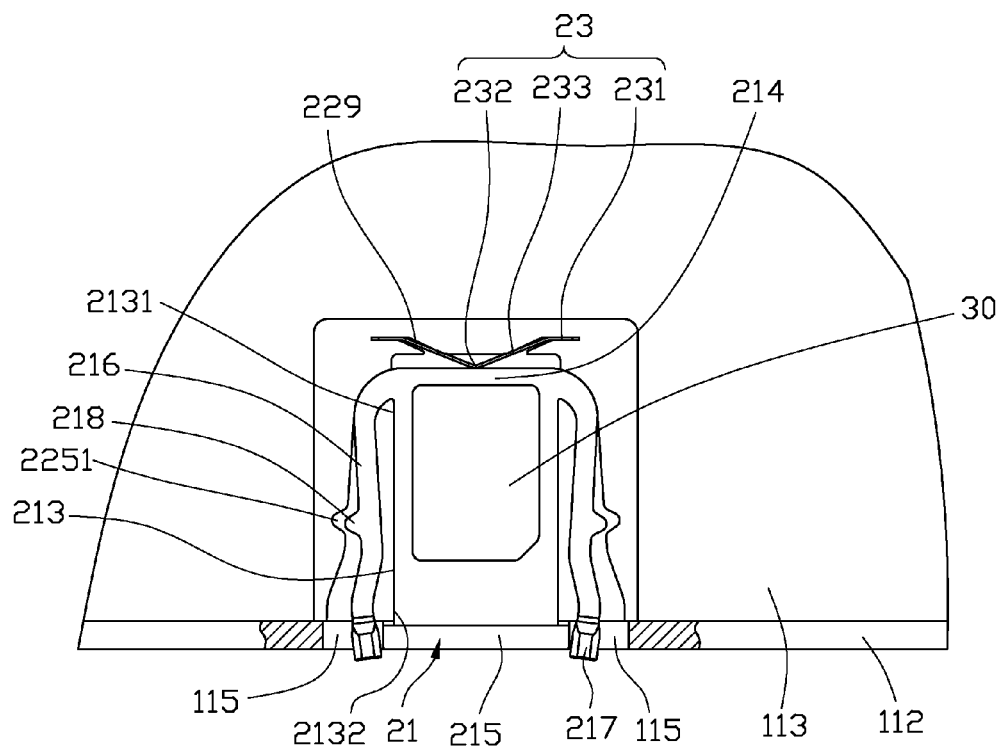
FIG. 6 is a second state top plan view of the electronic card connector shown in FIG. 1.

As shown in FIG. 6, a pressure can be applied on the two free ends 217 of two elastic arms 216 to enable the elastic arms 216 to move towards each other so that the two protrusions 218 can disengage from the two notches 2251 respectively. When the two protrusions 218 disengage from the two notches 2251, the elastic restoring force of the elastic member 23 can drive the tray 21 to move out from the second accommodating space 224.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic device comprising a housing and an electronic card connector, the housing comprising a first supporting wall and at least one peripheral sidewall connected to the first supporting wall, the first supporting wall and the at least one peripheral sidewall defining a first accommodating space, one of the at least one peripheral sidewall defining a first through hole and two second through holes locating on two sides of the first through hole and communicating with the first through hole, the electronic card connector comprising
   a tray comprising
      a main body defining a card slot for accommodating an electronic card, the tray comprising a first end, a second end opposite to the first end and two sidewalls coupling the first end with the second end, the sidewall having a first side close to the first end and a second side close to the second end; and
      two elastic arms protruding from the first sides and extending towards the second sides respectively, and each of the elastic arm comprising a protrusion protruding from one side of the elastic arm away from the sidewall; and
   a fixing member configured to be received in the first accommodating space and defining a second accommodating space, the fixing member comprising two notches corresponding to the two protrusions;
   wherein when the main body is received in the second accommodating space, each of the two elastic arms is received in one of the two second through holes, and each of the two protrusions is received in one of the two notches respectively to engage the tray with the fixing member; when a pressure is applied on the two elastic arms to enable the two protrusions to disengage from the two notches, the tray is disengaged from the fixing member.

2. The electronic device as described in claim 1, wherein the distance between the elastic arm and the sidewall is increasing from the first end to the second end.

3. The electronic device as described in claim 1, wherein the length of the elastic arm is larger than that of the sidewall and passes through the second through hole to be exposed out of the housing.

4. The electronic device as described in claim 1, wherein the fixing body further has two first sidewalls, an opening, a second sidewall facing to the opening, and a second supporting wall; and the second accommodating space is formed by the two first sidewalls, the opening, the second sidewall and the second supporting wall, and the second accommodating space is used for accommodating the main body of the tray.

5. The electronic device as described in claim 4, wherein the shape of the first sidewall is matched with the shape of the elastic arm, the notch is defined on the first sidewall, and the notch accommodates the protrusion to engage the tray with the fixing body.

6. The electronic device as described in claim 1, wherein the electronic card connector further comprises an elastic member resisted between the first end and the second sidewall.

7. The electronic device as described in claim 6, wherein the fixing body defines a slot on the second sidewall, the elastic member includes two fixing portions, a resisting portion and two connecting portions coupling the two fixing portions with the resisting portion, the fixing portion is received in the slot, the resisting portion and the two connecting portions are received in the second accommodating space, and the resisting portion further resists on the first end of the main body.

8. The electronic device as described in claim 1, wherein the fixing body further defines a number of accommodating holes on the second supporting wall surface of the fixing member, the housing can further include a number of second protrusions protruded from the first supporting wall of the housing, each of the second protrusions receives in one of the accommodating holes respectively to fix the fixing member to the housing.

9. An electronic card connector, applied on a housing, the housing comprising a first supporting wall and at least one peripheral sidewall connected to the first supporting wall, the first supporting wall and the at least one peripheral sidewall defining a first accommodating space, one of the at least one peripheral sidewall defining a first through hole and two second through holes locating on two sides of the first through hole and communicating with the first through hole, the electronic card connector comprising:

a tray comprising:
        a main body defining a card slot for accommodating an electronic card, the tray comprising a first end, a second end opposite to the first end and two sidewalls coupling the first end with the second end, the sidewall having a first side close to the first end and a second side close to the second end; and
        two elastic arms protruding from the first sides and extending towards the second sides respectively, and each of the elastic arm comprising a protrusion protruding from one side of the elastic arm away from the sidewall; and
    a fixing member configured to be received in the first accommodating space and defining a second accommodating space, and the fixing member comprising two notches corresponding to the two protrusions;
    wherein when the main body is received in the second accommodating space, each of the two elastic arms is received in one of the two second through holes, and each of the two protrusions is received in one of the two notches respectively to engage the tray with the fixing member; when a pressure is applied on the two elastic arms to enable the two protrusions to disengage from the two notches, the tray is disengaged from the fixing member.

10. The electronic card connector as described in claim 9, wherein the distance between the elastic arm and the sidewall is increasing from the first end to the second end.

11. The electronic card connector as described in claim 9, wherein the length of the elastic arm is larger than that of the sidewall and passes through the second through hole to be exposed out of the housing.

12. The electronic card connector as described in claim 9, wherein the fixing body further has two first sidewalls, an opening, a second sidewall facing to the opening, and a second supporting wall; and the second accommodating space is formed by the two first sidewalls, the opening, the second sidewall and the second supporting wall, and the second accommodating space is used for accommodating the main body of the tray.

13. The electronic card connector as described in claim 12, wherein the shape of the first sidewall is matched with the shape of the elastic arm, the notch is defined on the first sidewall, and the notch accommodates the protrusion to engage the tray with the fixing body.

14. The electronic card connector as described in claim 9, wherein the electronic card connector further comprises an elastic member resisted between the first end and the second sidewall.

15. The electronic card connector as described in claim 14, wherein the fixing body defines a slot on the second sidewall, the elastic member can include two fixing portions, a resisting portion and two connecting portions coupling the two fixing portions with the resisting portion, the fixing portion is received in the slot, the resisting portion and the two connecting portions are received in the second accommodating space, and the resisting portion further resists on the first end of the main body.

\* \* \* \* \*